United States Patent [19]

House

[11] 4,382,868

[45] May 10, 1983

[54] ORGANOPHILIC CLAY GELLANTS

[75] Inventor: Roy F. House, Houston, Tex.

[73] Assignee: Venture Innovations, Inc., Houston, Tex.

[21] Appl. No.: 292,408

[22] Filed: Aug. 13, 1981

[51] Int. Cl.$^3$ .......................... C10M 5/20; C10M 5/24
[52] U.S. Cl. .................................... 252/28; 252/49.5; 252/315.2
[58] Field of Search .......................... 252/28, 316, 49.5

[56] References Cited

U.S. PATENT DOCUMENTS

| 3,654,171 | 4/1972 | Emond et al. | 252/28 |
| 3,755,166 | 8/1973 | Abbott et al. | 252/28 |
| 3,812,937 | 5/1974 | Abbott et al. | 252/28 |
| 4,040,974 | 8/1977 | Wright et al. | 252/28 |
| 4,116,866 | 9/1978 | Finlayson | 252/28 |
| 4,287,086 | 9/1981 | Finlayson et al. | 252/28 |

Primary Examiner—Jacqueline V. Howard
Attorney, Agent, or Firm—Roy F. House

[57] ABSTRACT

The invention provides methods of preparing organophilic clays having enhanced dispersibility in organic liquids, the organophilic clay containing gellants, and methods of increasing the viscosity of organic liquids utilizing these gellants.

38 Claims, No Drawings

ORGANOPHILIC CLAY GELLANTS

The present invention relates to organophilic clays, particularly organophilic clay gellants of the type obtained by reacting smectite clay with a quaternary cationic organic compound, and methods of preparing such organophilic clays.

It is well known that organic compounds which contain a cation will react with clays which have an anionic surface and exchangeable cations to form organoclays. Depending on the structure and quantity of the organic cation and the characteristics of the clay, the resulting organoclay may be organophilic and hence have the property of swelling or dispersing and gelling in certain organic liquids depending on the concentration of organoclay, the degree of shear applied, and the presence of a dispersant. See for example the following U.S. Patents, all incorporated herein by reference for all purposes U.S. Pat. No. 2,531,427 (Hauser); U.S. Pat. No. 2,966,506 (Jordan); U.S. Pat. No. 4,105,578 (Finlayson and Jordan); U.S. Pat. No. 4,208,218 (Finlayson); and the book "Clay Mineralogy", 2nd Edition, 1968 by Ralph E. Grim, McGraw-Hill Book Co., Inc., particularly Chapter 10—Clay Mineral-Organic Reactions, pp. 356-368—Ionic Reactions, Smectite, and pp. 392-401—Organophilic Clay-Mineral Complexes.

Many uses have been proposed for organophilic clays, particularly as thickeners and/or suspending agents in oleaginous liquids, such as for example, in oil base drilling fluids, oil base packer fluids, greases and the like. Such uses are disclosed in several U.S. Patents including: U.S. Pat. No. 2,531,812 (Hauser); U.S. Pat. No. 3,831,678 (Mondshine); U.S. Pat. No. 3,537,994 (House); and others referenced herein.

Despite the myriad of organoclays disclosed in the prior art, there are relatively few which have found any appreciable utility. The organoclays available commercially utilize either montmorillonite (particularly bentonite), hectorite or attapulgite as the clay reactant and a quaternary ammonium salt selected from the group consisting of dimethyl dihydrogenatedtallow ammonium chloride, dimethyl benzyl hydrogenatedtallow ammonium chloride, methyl benzyl dihydrogenatedtallow ammonium chloride, and mixtures of the first two salts as the cationic reactant.

One of the problems in utilizing any organoclay is obtained good dispersion of the organoclay in the desired oleaginous liquid. Since the commercial introduction of organophilic clays it has become well known to gain the maximum gelling (thickening) efficiency from these organophilic clays by adding a low molecular weight polar organic material to the composition. Such polar organic materials have been variously called dispersants, dispersion aids, solvating agents, dispersion agents and the like. See for example the following U.S. Patents: O'Halloran U.S. Pat. No. 2,677,661; McCarthey et al., U.S. Pat. No. 2,704,276; Stratton U.S. Pat. No. 2,833,720; Stratton U.S. Pat. No. 2,879,229; Stransfield et al., U.S. Pat. No. 3,294,683. An excellent review of the variables which affect the gelation of oils by organophilic clays to form greases is given by C. J. Boner in his book "Manufacture and Applications of Lubricating Greases", 1954 (Reinhold Publishing Corp.), pp. 724-748-Clay Base Thickeners.

The dispersion of an organophilic clay in an oleaginous liquid is increased as the degree of shear applied to the mixture increases, particularly when a polar organic dispersant is present in the mixture. Heat may also be useful in obtaining good dispersion although heat and shear alone or in combination, without a dispersant being present, do not efficiently disperse the organoclay.

Generally in preparing oil base well working compositions, such as invert emulsion drilling, workover, completion, and packer fluids, high shear mixing equipment such as a colloid mill is not utilized nor are the polar organic dispersants. Rather the water present in the emulsion, which generally comprises from about 10% to about 50% by volume of the liquid phase, is utilized as the dispersant. While water can function as a dispersant for certain organophilic clays, it is a poor dispersant and inefficient thickening or suspension is obtained from the organoclay.

I have found that organophilic clays prepared by extruding a mixture of a smectite clay, a quaternary cationic organic compound, water and an alcohol having from 1 to 5 carbon atoms in certain specified ratios are readily dispersible in oleaginous liquids provided that the organophilic clay is not dried to remove the moisture or alcohol therefrom. I have also found that the organophilic clays prepared by such an extrusion process can be provided in an even more readily dispersible form by pre-dispersing the organophilic clay in a mixture of water and an alcohol having from 1 to 5 carbon atoms.

Accordingly, it is an object of this invention to provide organoclay viscosifiers which are more easily dispersed in oleaginous liquids than prior art organoclay viscosifiers.

It is another object of this invention to provide organoclay slurry viscosifiers which are readily dispersible in oleaginous liquids comprising organoclays pre-dispersed in mixtures of water and polar organic liquids.

It is still another object of this invention to provide methods for the manufacture of organoclay viscosifiers which have enhanced dispersibility in oleaginous liquids and of organoclay slurry viscosifiers containing organophilic clays pre-dispersed in mixtures of water and water-miscible polar organic liquids.

Yet another object of this invention is to provide a method of increasing the viscosity of an oleaginous liquid.

Other objects and advantages of this invention will become apparent to one skilled in the art upon reading this specification and the appended claims.

The organophilic clays prepared by the process of this invention comprise the reaction product of a smectite clay and an organic quaternary compound.

The smectite clay must have a cation exchange capacity of at least 75 milliequivalents per 100 grams of 100% active clay. The preferred smectite clay is montmorillonite, particularly the naturally occurring Wyoming variety of swelling bentonite. Other smectite clays which may be useful in practicing this invention are hectorite and saponite. The clays may be converted to the sodium form if they are not already in this form. This can conveniently be accomplished by preparing an aqueous clay slurry and passing the slurry through a bed of cation exchange resin in the sodium form, optionally with centrifugation to remove the non-clay impurities from the smectite clay, and spray drying the slurry to obtain a particulate form of sodium exchanged clay. Alternatively the clay can be mixed with water and a soluble sodium compound such as sodium bicarbonate, sodium carbonate, sodium hydroxide and the like, optionally with an alkaline earth metal compound selected from the group consisting of magnesium oxide, magnesium carbonate, magnesium hydroxide, calcium oxide, calcium hydroxide, and mixtures thereof, and shearing the mixture such as with a pugmill or extruder. The smectite clay may be synthesized utilizing a hydrothermal synthesis process, as is well known, however, such clays are too expensive for most industrial uses.

The cation exchange capacity of the smectite clay can be determined by the well known ammonium acetate method.

The activity of the clay must be known in order to prepare the organophilic clays of this invention. When it is desired to react the raw clay or any clay which is not 100% active, the percent active clay can be determined using the following procedure: (1) To 350 ml. of water in a stainless steel Multimixer container add 2 ml. of a 5% tetrasodium pyrophosphate solution and agitate; (2) Sift in 20 grams of ground clay and continue the agitation for 20 minutes, periodically scraping the sides of the container; (3) Withdraw from the slurry while it is being agitated two samples of approximately 20 ml. each; (4) Determine the total solids in one of the samples; (5) Pour the second sample into two 10 ml. test tubes and centrifuge the samples at 1700 rpm for one minute (6" spin diameter); (6) Pour out the supernatent phase from each tube and determine the total solids therein; (7)The present active clay can be calculated using the following formula:

$$\% \text{ Active Clay} = \frac{\% \text{ Solids in Supernatent Phase}}{\% \text{ Solids in Original Slurry}} \times 100$$

The organic quaternary compounds useful in the practice of this invention are selected from the group consisting of quaternary ammonium salts, quaternary phosphonium salts, and mixtures thereof. Representative quaternary phosphonium salts are disclosed in the following U.S. Patents, all incorporated herein by reference: U.S. Pat. No. 3,929,849 (Oswald) and U.S. Pat. No. 4,053,493 (Oswald). Representative quaternary ammonium salts are disclosed in U.S. Pat. No. 4,081,496 (Finlayson), incorporated herein by reference, in addition to the patents previously cited herein.

The preferred quaternary compounds comprise a quaternary ammonium salt having the structural formula

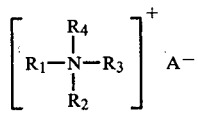

wherein $R_1$, $R_2$, $R_3$, and $R_4$ are independently selected from the group consisting of $C_aH_{2a+1-x} B_x$, $C_bH_{2b-1-x} B_x$, $C_6H_{5-x} B_x CH_2$, and mixtures thereof, $1 \leq a \leq 30$, $3 \leq b \leq 30$, $0 \leq x \leq 2$, B is a radical selected from the group consisting of OH, Cl, Br, $C_6H_5$, and mixtures thereof, and A is a charge balancing anion, provided that at least one R contains at least 12 carbon atoms, and $R_1$, $R_2$, $R_3$, and $R_4$ collectively contain at least 20 carbon atoms. Most preferably $x=0$, and B is OH when $x>0$. A is preferably selected from the group consisting of Cl, Br, I, $NO_2$, OH, $CH_3SO_4$, and mixtures thereof, most preferably Cl.

Exemplary preferred quaternary ammonium cations are selected from the group consisting of trimethyl octadecyl ammonium, trimethyl hydrogenated tallow ammonium, trimethyl ricinoleyl ammonium, dimethyl didodecyl ammonium, dimethyl dioctadecyl ammonium, dimethyl dicoco ammonium, dimethyl dihydrogenated tallow ammonium, dimethyl diricinoleyl ammonium, dimethyl benzyl octadecyl ammonium, dimethyl benzyl hydrogenated tallow ammonium, dimethyl benzyl ricinoleyl ammonium, methyl benzyl dioctadecyl ammonium, methyl benzyl dihydrogenated tallow ammonium, methyl benzyl diricinoleyl ammonium, methyl benzyl dicoco ammonium, methyl dibenzyl octadecyl ammonium, methyl dibenzyl hydrogenated tallow ammonium, methyl dibenzyl ricinoleyl ammonium, methyl dibenzyl coco ammonium, methyl trioctadecyl ammonium, methyl trihydrogenated tallow ammonium, methyl triricinoleyl ammonium, methyl tricoco ammonium, dibenzyl dicoco ammonium, dibenzyl dihydrogenated tallow ammonium, dibenzyl dioctadecyl ammonium, dibenzyl diricinoleyl ammonium, tribenzyl hydrogenated tallow ammonium, tribenzyl dioctadecyl ammonium, tribenzyl coco ammonium, tribenzyl ricinoleyl ammonium, and mixtures thereof.

The amount of the organic quaternary cationic compound added to the clay must be sufficient to render the resulting organoclay useful for its intended purpose. Generally there is a specific ratio of clay and quaternary compound which provides the optimum desired property in an oleaginous medium, and this ratio will vary depending on the characteristics of the oleaginous medium. Thus, in general, as the aromaticity of the oleaginous medium increases, the ME ratio decreases. The ME ratio (milliequivalent ratio) is defined as the number of milliequivalents of the quaternary cationic compound in the organophilic clay, per 100 grams of clay, 100% active clay basis.

The preferred organophilic clays of this invention have a ME ratio from about 75 to about 120. The optimum ME ratio will depend on the particular clay and cationic quaternary compound used to prepare the organophilic clay, and on the particular oleaginous liquid in which it is desired to utilize the organophilic clay. In general, it has been found that the gelling efficiency of organophilic clays in polar organic liquids increases as the ME ratio decreases. Conversely, the gelling efficiency of organophilic clays in non-polar oleaginous liquids increases as the ME ratio increases until an optimum is reached which is generally in the range from about 90 to about 120 depending on the particular oleaginous liquid to be viscosified.

The processes of this invention result in the preparation of organophilic clays which have enhanced dispersibility as compared to prior art processes for making the organophilic clays. Thus it is anticipated that organophilic clays can be prepared by the processes of this invention which may have utility in certain oleaginous mediums and which may not have any such utility if prepared by the prior art processes. For instance, organophilic clays can be prepared at lower ME ratios by the processes of this invention than by the dispersed clay processes of the prior art, and these organophilic clays, particularly when utilized in the slurry state of this invention as disclosed hereinafter, should be dispersible in selected organic liquids to provide useful properties therein.

It is also anticipated that other organic cationic compounds can be used to prepare organoclays by the processes of this invention which would have no utility, due to a lack of dispersibility, if prepared by prior art processes. Thus it has been variously disclosed to prepare organoclays from primary amine salts, secondary amine salts, tertiary amine salts, diamine salts, partial amides of polyamines, polyquaternary ammonium compounds, and the like. However, the efficiency of these organoclays in various organic liquids is poor which is due in part to the poor dispersibility of these organoclays in the organic liquids.

The organophilic clays produced by the processes of this invention are provided in particulate or slurry form.

Thus the invention provides a particulate gellant comprising from about 58% to about 80% of an organophilic clay, from about 3% to about 10% of an alcohol having from 1 to 5 carbon atoms, and from about 15% to about 40% water. Preferably the particulate gellant contains from about 61% to about 75% of an organophilic clay, from about 4% to about 9% of said alcohol, and from about 17% to about 35% water.

The invention also provides an organophilic clay gellant slurry containing from about 20% to about 40% of an organophilic clay, from about 24% to about 78% water, and from about 2% to about 48% of an alcohol having from 1 to 5 carbon atoms, wherein the water to alcohol weight ratio is in the range from about 97.5/2.5 to about 35/65. Preferably the slurry contains from about 35% to about 75% water, and from about 5% to about 30% of said alcohol, wherein the water to alcohol weight ratio is in the range from about 87.5/12.5 to about 65/35.

The process of this invention for preparing the particulate gellant comprises extruding a mixture containing the clay, organic cationic compound, water, and an alcohol containing from 1 to 5 carbon atoms, and thereafter grinding the organophilic clay extrudate without drying the water or alcohol therefrom. Preferably the clay, organic cationic compound, and alcohol are intimately mixed together before adding the water thereto. As noted previously, the amount of organic quaternary compound is preferably in the range from about 75 to about 120 milliequivalents per 100 grams of clay, 100% active clay basis, and most preferably from about 80 to about 110. The amount of water present in the mixture should be from about 25% to about 100%, based on the weight of 100% active clay, and most preferably from about 35% to about 75%. The amount of alcohol should be from about 5% to about 30%, based on the weight of 100% active clay, most preferably from about 10% to about 25%.

The organophilic clay, for the purposes of this invention, is considered to be the combination of the moisture free clay, including the solid impurities therein, and the organic cationic compound on a 100% active basis. Thus for instance, if 100 parts of a smectite clay containing 10% moisture and 20% non-clay solid impurities were reacted with 50 parts of a 75% active quaternary ammonium chloride, then the amount of organophilic clay obtained would be 90+37.5=127.5 parts.

It has been found that the organophilic clay resulting from this processing has enhanced dispersibility in oleaginous liquids as compared to the organophilic clay (having the same ME ratio of clay and organic cationic compound) prepared by the prior art processes.

The process of this invention for preparing an organophilic clay gellant slurry comprises extruding a mixture containing the clay, organic cationic compound, water, and an alcohol containing from 1 to 5 carbon atoms, and thereafter shearing the organophilic clay extrudate in sufficient water and an alcohol containing from 1 to 5 carbon atoms to produce a slurry of the organophilic clay in the water/alcohol mixture. The organophilic clay extrudate may be ground to a particulate form before forming the slurry, if desired. It is preferred that the clay, organic cationic compound, and at least a portion of the alcohol be thoroughly mixed before adding the water and any remaining alcohol prior to extrusion of the mixture. The amount of organic cationic compound is the same as discussed hereinbefore since the amount is governed by the characteristics desired in the organophilic clay and not by the processing steps per se. The amount of water present in the mixture during extrusion should be from about 20% to about 100%, based on the weight of 100% active clay, preferably from about 35% to about 75%. The amount of alcohol should be from about 5% to about 50%, based on the weight of 100% active clay, preferably from about 5% to about 30%. The amount of water and alcohol which are sheared with the organophilic clay extrudate must be sufficient to produce a slurry containing from about 20% to about 40% organophilic clay, from about 24% to about 78% water, and from about 2% to about 48% of said alcohol, wherein the water to alcohol ratio is in the range from about 97.5/2.5 to about 35/65, preferably from about 87.5/12.5 to about 65/35.

The organophilic clay gellant slurries of this invention have enhanced dispersiblity over prior art organophilic clays as well as the particulate organophilic clay gellants of this invention. This is particularly evident when the only mixing equipment available for mixing the organophilic clay with an oleaginous liquid is relatively low shear equipment.

The term "extruding" as used in connection with the present invention is intended to mean any type of processing in which the clay, organic cationic compound, water, and alcohol are intimately mixed under sufficient pressure for the clay and organic cationic compound to react. The intensity of mixing is such that heat is evolved during the extrusion. Thus applicable equipment for conducting the extruding step are extruders, pug mills, 2-roll mills, and the like.

The alcohols useful in this invention are the lower molecular weight alcohols containing from 1 to 5 carbon atoms. Representative alcohols are methanol, ethanol, propanol, isopropanol, butanol, pentanol, and the like. Preferred alcohols contain 1 to 3 carbon atoms, i.e., methanol, ethanol, propanol, isopropanol, and mixtures thereof. Most preferred is isopropanol.

Other water soluble low molecular weight polar organic liquids may be used as a replacement for the alcohol, or at least as a partial replacement. Such liquids may be ketones, amides, nitriles, nitro compounds, esters, carbonates, and the like, such as acetone, dimethyl formamide, acetonitrile, nitromethane, methyl formate, propylene carbonate, etc.

The organophilic clays of this invention, whether in particulate or slurry form, are useful as thickeners or suspending agents in organic liquids. The preferred organophilic clays are efficient thickeners or suspending agents in oleaginous liquids, particularly for use in oil or gas well drilling fluids, workover fluids, completion fluids, coring fluids, packer fluids, and the like. Such fluids are well known.

A further embodiment of this invention is to provide a method of increasing the viscosity of an organic liquid which comprises mixing with the organic liquid either the particulate organoclay gellant of this invention or the organoclay gellant slurry of this invention. Thus in its broadest aspects, the invention comprises a method for increasing the viscosity of an organic liquid which comprises either:

A. extruding a mixture containing a clay, an organic cationic compound, water, and an alcohol containing from 1 to 5 carbon atoms, and thereafter dispersing the organophilic clay-containing extrudate into the organic liquid; or B. extruding a mixture containing a clay, an organic cationic compound, water, and an alcohol containing from 1 to 5 carbon atoms, shearing the organophilic clay extrudate in sufficient water and said alcohol to produce a slurry, and thereafter dispersing the slurry into the organic liquid.

As a further embodiment of this invention, it has been found that a defloculant for the organophilic clay can be added to the organoclay gellant slurry to decrease the viscosity of the slurry, thus allowing a larger concentration of organophilic clay to be present in the slurry. Suitable defloculants are lignite salts, lignosulfonate salts, alkali metal polyphosphates, tannins, and the like known defloculants for clays.

The following examples illustrate specific preferred embodiments of the invention and are not intended to be limiting. Certain quaternary ammonium salts such as dimethyl dihydrogenatedtallow ammonium chloride are solid or semi-solid at room temperature even in the presence of substantial quantities of a solvent such as isopropanol or isopropanol/water solutions. It has been found that the viscosity of such mixtures can be decreased by shearing the mixture. Thus a 75% mixture of dimethyl dihydrogenatedtallow ammonium chloride in an 18/7 solution of isopropanol/water is a semi-solid which upon shearing in a Waring Blendor becomes pourable, and appears to be a suspension of dimethyl dihydrogenatedtallow ammonium chloride particles in the isopropanol/water solution.

In the examples, the following materials were used unless otherwise indicated: AQUAGEL Wyoming bentonite contains 9% moisture and 14.1% nonclay solids; Quat is dimethyl dihydrogenatedtallow ammonium chloride (DMDHTAC), molecular weight 565, 75% active (25% isopropanol). All percentages are % by weight.

EXAMPLE 1

Organoclay samples were prepared by mixing together 59 parts of AQUAGEL (53.7 parts moisture free clay or 46.1 parts 100% active clay) and the amount of Quat indicated in Table 1 with a Waring Blendor. 25 parts of water were added and mixed in a Waring Blendor. This mixture was extruded by passing it three times through a laboratory extruder. Thereafter the sample was ground in a Waring Blendor. The samples thus contained 30.3 parts of water for each 53.7 parts of moisture free clay.

The organoclay samples were evaluated as gellants for diesel oil by mixing together for five minutes on a Multimixer the following: 225.7 parts diesel oil; sufficient sample to give 10.0 parts of organoclay, moisture and isopropanol free basis (i.e., DMDHTAC plus moisture free clay); sufficient water such that the composition contained 24.5 parts total water; and sufficient isopropanol such that the composition contained 5.5 parts isopropanol. The viscosities of the composition at 600, 300 and 3 rpm were obtained with a Fann Model 35 Viscometer in accordance with the American Petroleum Institute's Standard Test Procedure RP13B. The data obtained are given in Table 1.

The data indicate that for this organoclay, i.e. dimethyl dihydrogenatedtallow ammonium bentonite, the ME ratio should be in the range from about 80 to about 110, preferably from about 82.5 to about 100, for optimum gelation of this diesel oil mixture.

TABLE 1

| | Quat (75% Active | | | Sample Composition | | | Diesel Oil Gel* Fann Viscosities | | |
|---|---|---|---|---|---|---|---|---|---|
| Organoclay | Parts DMDHTAC | Parts IPA | ME Ratio | % Organoclay | % Water | % IPA | 600 | 300 | 3 |
| 1 | 19.5 | 6.5 | 75 | 66.5 | 27.5 | 6.0 | 20 | 12 | 2 |
| 2 | 20.6 | 6.9 | 79 | 66.6 | 27.2 | 6.2 | 57 | 43 | 24 |
| 3 | 21.75 | 7.25 | 83.5 | 66.8 | 26.8 | 6.4 | 70 | 56 | 36 |
| 4 | 24.0 | 8.0 | 92 | 67.0 | 26.1 | 6.9 | 84 | 73 | 45 |
| 5 | 26.25 | 8.75 | 101 | 67.2 | 25.5 | 7.3 | 71 | 59 | 36 |

*10 parts Organoclay, 225.7 parts diesel oil, 24.5 parts total water, 5.5 parts total isopropyl alcohol (IPA)

EXAMPLE 2

Organoclay samples were prepared utilizing the procedure of Example 1 wherein 59 parts of AQUAGEL, 32 parts of Quat, and various quantities of water were mixed and extruded together as indicated in Table 2. These organoclays were evaluated as in Example 1. The data obtained are given in Table 2.

The data indicate that the amount of total water (added water + moisture in clay) which is necessary for the preparation of an efficient organoclay gellant is greater than about 35% based on the weight of 100% active clay, preferably from about 35% to about 100%, and most preferably from about 35% to about 75%.

TABLE 2

| | Effect of Water Concentration During Extrusion | | | | | | |
|---|---|---|---|---|---|---|---|
| | | Sample Composition | | | | | |
| Organoclay | % Total Water Based on 100% Active Clay | % Organoclay | % Water | % IPA | Diesel Oil Gel Fann Viscosities | | |
| | | | | | 600 | 300 | 3 |
| 1 | 11.5 | 85.4 | 5.8 | 8.8 | 32 | 22 | 8 |
| 2 | 33.2 | 77.0 | 15.1 | 7.9 | 30 | 21 | 7 |
| 3 | 44.0 | 73.3 | 19.2 | 7.5 | 81 | 69 | 43 |
| 4 | 49.5 | 71.6 | 21.0 | 7.4 | 83 | 70 | 47 |
| 5 | 54.9 | 70.0 | 22.8 | 7.2 | 78 | 64 | 40 |
| 6 | 65.7 | 67.0 | 26.1 | 6.9 | 84 | 73 | 45 |
| 7 | 76.6 | 64.2 | 29.2 | 6.6 | 71 | 55 | 32 |
| 8 | 87.4 | 61.7 | 32.0 | 6.3 | 69 | 56 | 33 |
| 9 | 98.3 | 59.3 | 34.6 | 6.1 | 69 | 56 | 32 |

EXAMPLE 3

A larger sample of Sample 4 of Example 1 (Table 1) was prepared and evaluated as in Example 1. The 600, 300 and 3 rpm Fann Viscometer dial readings were 86, 73 and 49 respectively.

Suspensions/slurries of this organoclay were prepared by mixing this organoclay gellant with various mixtures of water and isopropanol in a Waring Blendor as indicated in Table 3. The condition of the suspensions/slurries after setting undisturbed for 16 hours was observed as indicated in Table 3. Thereafter certain of the suspension/slurries were evaluated as gellants for diesel oil as indicated in Table 4.

The data indicate that these organoclay suspensions/slurries were efficient gellants for diesel oil provided the water/isopropanol ratio in the slurry was greater than about 35/65.

The viscosity of the suspensions/slurries increased as the concentration of isopropanol (up to about a 60/40 water/isopropanol ratio) or the concentration of organoclay increased. It is preferred that the suspension/slurry be pourable thus facilitating handling of the organoclay. It is also preferred that the suspension/slurry be sufficiently stable that no hard settling occur on aging, i.e., no extensive syneresis, such that the organoclay can be easily removed from its container.

It was observed that the rate of gelation increased as the concentration of isopropanol in the suspension/slurry increased, i.e., the dispersibility of the organoclay increased as the concentration of isopropanol in the suspension/slurry increased.

TABLE 3

| | Organoclay Suspension/Slurry | | |
|---|---|---|---|
| Sample | % Organoclay[1] | Water/IPA Weight Ratio | Condition After 16 Hours |
| 1 | 25 | 90/10 | Extensive H$_2$O separation on bottom. Pourable |
| 2 | 25 | 85/15 | Extensive H$_2$O separation on bottom. Pourable |
| 3 | 25 | 75/25 | Very slight syneresis. Pourable |
| 4 | 25 | 70/30 | Very slight syneresis. Pourable |
| 5 | 25 | 65/35 | Very slight syneresis. Pourable |
| 6 | 25 | 55/45 | Extensive syneresis. Pourable |
| 7 | 25 | 50/50 | Extensive syneresis. Pourable |
| 8 | 25 | 40/60 | Extensive syneresis. Pourable |
| 9 | 25 | 30/70 | Extensive syneresis. Pourable |
| 10 | 25 | 20/80 | Extensive syneresis. Pourable |
| 11 | 25 | 12/88 | Extensive syneresis. Pourable |
| 12 | 30 | 75/25 | Very slight syneresis. Pourable |
| 13 | 35 | 75/25 | Very slight syneresis. Not pourable |
| 14 | 30 | 96.5/3.5 | Water separation on bottom. Pourable |
| 15 | 35 | 96.5/3.5 | Very slight syneresis. Barely pourable |
| 16 | 40 | 96.5/3.5 | Very slight syneresis. Not pourable |

[1]DMDHTAC plus moisture free clay

TABLE 4

| | Evaluation of Organoclay Suspensions/Slurries | | | | | |
|---|---|---|---|---|---|---|
| | Parts Diesel | Parts | Parts | Diesel Oil Gel Fann Viscosities | | |
| Sample | Oil | Sample | Organoclay[1] | 600 | 300 | 3 |
| 2 | 225.7 | 40.0 | 10.0 | 85 | 70 | 41 |
| 3 | 22517 | 40.0 | 10.0 | 83 | 72 | 46 |
| 4 | 225.7 | 40.0 | 10.0 | 88 | 75 | 45 |
| 5 | 225.7 | 40.0 | 10.0 | 87 | 73 | 44 |
| 7 | 225.7 | 40.0 | 10.0 | 80 | 67 | 38 |
| 8 | 225.7 | 40.0 | 10.0 | 82 | 68 | 54 |
| 9 | 225.7 | 40.0 | 10.0 | 57 | 44 | 27 |
| 10 | 225.7 | 40.0 | 10.0 | 57 | 44 | 28 |
| 11 | 225.7 | 40.0 | 10.0 | 44 | 33 | 23 |
| 12 | 231.2 | 33.3 | 10.0 | 83 | 69 | 42 |
| 13 | 235.6 | 28.6 | 10.0 | 83 | 69 | 41 |
| 15 | 235.6 | 28.6 | 10.0 | 54 | 40 | 20 |
| 15[2] | 235.6 | 28.6 | 10.0 | 82 | 71 | 39 |

[1]DMDHTAC moisture free clay
[2]4 parts IPA added to diesel oil

EXAMPLE 4

59 parts of AQUAGEL Wyoming bentonite were mixed with 25 parts of water followed by the addition and mixing of 32 parts of Quat. The mixture was then extruded thrice through a meat grinder and ground in a Waring Blendor. This organoclay was evaluated as a gellant for diesel oil as in Example 1. The 600, 300, and 3 rpm Fann Viscometer dial readings were 110, 95 and 61, respectively.

EXAMPLE 5

A large sample of Sample 4 of Example 1 (Table 1) was prepared and evaluated as in Example 1. The 600, 300 and 3 rpm Fann Viscometer readings were 94, 81 and 56 respectively. A portion of this organoclay was dried to a moisture content of 4% at 150° F. The organoclay before and after drying was evaluated as a gellant for diesel oil in which the concentrations of water and isopropanol were varied as indicated in Table 5.

The results obtained, given in Table 5, indicate that the organoclay should not be dried in order to preserve the enhanced gelation characteristics and improved dispersibility of the organoclay.

TABLE 5

| Sample | Parts Sample | Parts Organoclay[1] | Parts Diesel Oil | Parts Added IPA | Parts Added Water | Diesel Oil gel Fann Viscosities | | |
|---|---|---|---|---|---|---|---|---|
| | | | | | | 600 | 300 | 3 |
| Example 5 | 14.9 | 10.0 | 225.7 | 0[2] | 0[3] | 55 | 43 | 23 |
| Example 5 | 14.9 | 10.0 | 225.7 | 0[2] | 20.6[4] | 77 | 63 | 38 |
| Example 5 | 14.9 | 10.0 | 225.7 | 4.5[5] | 0[3] | 87 | 72 | 39 |
| Example 5 | 14.9 | 10.0 | 225.7 | 4.5[5] | 20.6[4] | 96 | 81 | 50 |
| Dried | 10.0 | 10.0 | 225.7 | 0 | 0 | Not dispersed | | |
| Dried | 10.0 | 10.0 | 225.7 | 1.0 | 3.9 | 29 | 20 | 8 |
| Dried | 10.0 | 10.0 | 225.7 | 1.0 | 24.5 | 55 | 43 | 26 |
| Dried | 10.0 | 10.0 | 225.7 | 5.5 | 3.9 | 39 | 30 | 14 |
| Dried | 10.0 | 10.0 | 225.7 | 5.5 | 24.5 | 78 | 65 | 38 |

[1]DMDHTAC moisture free clay.
[2]Total IPA in diesel oil gel is 1.0 part from sample.
[3]Total water in diesel oil gel is 3.9 parts from sample.
[4]Total water in diesel oil gel is 24.5 parts.
[5]Total IPA in diesel oil gel is 5.5 parts.

EXAMPLE 6

An organoclay sample was prepared utilizing the procedure of Example 1 wherein 59 parts of AQUAGEL, 37 parts of dimethyl dihydrogenatedtallow ammonium chloride (M.W. of 565, 65% active (35% isopropanol)), and 10 parts of water were mixed and extruded together. This sample, which contained 73.3% organoclay (92 ME ratio), 14.4% water and 12.3% isopropanol, was evaluated as in Example 1. The 600, 300, and 3 rpm Fann Viscometer dial readings were 55, 42, and 22, respectively. The sample dispersed poorly.

A slurry of this organoclay containing 30% organoclay in a solution having an 85/15 weight ratio of water/isopropanol was prepared and evaluated as in Example 3. The 600, 300, and 3 rpm Fann Viscometer dial readings were 110, 93, and 59, respectively.

EXAMPLE 7

Example 6 was repeated except that 7.5 parts of water and 42 parts of dimethyl dihydrogenatedtallow ammonium chloride (M.W. of 565, 57.1% active (42.9% isopropanol)) were used. The sample thus contained 71.6% organoclay (92 ME ratio), 11.8% water, and 16.6% isopropanol. Upon evaluation as in Example 6, the 600, 300, and 3 rpm Fann dial readings were 31, 21, and 9, respectively. The sample dispersed poorly.

The slurry of this organoclay exhibited 600, 300, and 3 rpm Fann dial readings of 130, 118, and 82, respectively.

EXAMPLE 8

An organoclay sample was prepared utilizing the procedure of Example 1 wherein 59 parts of AQUAGEL, 26.4 parts of dimethyl dihydrogenatedtallow ammonium chloride (M.W. of 565, 82.5% active (17.5% isopropanol)), and 40 parts of water were used. This sample, which contained 60.2% organoclay (83.5 ME ratio), 36.1% water, and 3.7% isopropanol, was evaluated as in Example 1. The 600, 300, and 3 rpm Fann dial readings were 75, 62, and 39, respectively.

EXAMPLE 9

An organoclay gellant was prepared by mixing together 59 parts of AQUAGEL and 36.0 parts of methyl benzyl dihydrogenatedtallow ammonium chloride (M.W.=625, 73.3% active in isopropanol) with a Waring Blendor. 20 parts of water were added and mixed in a Waring Blendor. This mixture was extruded by passing it three times through a laboratory extruder.

The organoclay sample, which contains 69.65% organoclay (92 ME ratio), 8.35% isopropanol and 22.0% water, was evaluated as in Example 1. The 600, 300, and 3 rpm Fann dial readings were 75, 64, and 44, respectively.

EXAMPLE 10

The organoclay of Example 9 was used to prepare a slurry in a mixture of water and isopropanol as in Example 3. The slurry contained 25% organoclay and had an 85/15 ratio of water/isopropanol. Upon evaluation as in Example 3, the 600, 300, and 3 rpm Fann dial readings obtained were 70, 58, and 41, respectively.

EXAMPLE 11

A dimethyl dihydrogenatedtallow ammonium bentonite, 92 ME ratio, sample containing 62.4% organoclay, 31.7% water, and 5.9% isopropanol was prepared and evaluated by the procedure of Example 1. The 600, 300, and 3 rpm Fann dial readings were 90, 76, and 47, respectively.

A slurry of this organoclay was prepared as follows: 35 parts of this sample containing 21.8 parts organoclay, 11.1 parts water and 2.1 parts isopropanol were mixed in a Waring Blendor with 16.8 parts water, 2.8 parts isopropanol, and 0.5 parts potassium lignite. The potassium lignite was dissolved in the water and isopropanol before adding the organoclay sample. The slurry obtained was pourable, and contained 40% organoclay in an 85/15 mixture of water and isopropanol. The slurry was evaluated as in Example 3. The 600, 300, and 3 rpm Fann dial readings were 79, 65, and 38, respectively.

COMPARATIVE EXAMPLE A 59 parts of AQUAGEL were mixed with 400 parts of water (150° F.) in a Waring Blendor. Thereafter 29 parts of Quat were added while mixing to form an organoclay. The organoclay was dried to 3% moisture content at 150° F. and thereafter evaluated as a gellant for diesel oil as in Example 1. The 600, 300, and 3 rpm Fann Viscometer dial readings were 26, 17 and 5, respectively.

COMPARATIVE EXAMPLE B

Organoclay Sample 3 of Example 1 (Table 1), prepared by reacting together 59 parts of AQUAGEL Wyoming bentonite clay with 29 parts of Quat by the process of this invention, was dried to 3% moisture content at 150° F. and thereafter evaluated as a gellant for diesel oil as in Example 1. The 600, 300, and 3 rpm Fann Viscometer dial readings were 60, 48 and 26, respectively.

COMPARATIVE EXAMPLE C

The procedure for Sample 5 of Example 1 (Table 1) was repeated except that the extrusion of the sample was not undertaken. Upon evaluation as a gellant for diesel oil as in Example 1, the 600, 300, and 3 rpm Fann Viscometer dial readings obtained were 42, 31 and 15, respectively.

COMPARATIVE EXAMPLE D

Organoclay Sample 4 of Example 1 (Table 1) was dried to 6% moisture content at 175° F. and thereafter evaluated as a gellant for diesel oil as in Example 1. The 600, 300, and 3 rpm Fann Viscometer dial readings were 70, 57 and 35, respectively.

COMPARATIVE EXAMPLE E 59 parts of AQUAGEL and 32 parts of Quat were mixed in a Waring Blendor. 148.8 parts of water and 19.2 parts of isopropyl alcohol were added and the mixture slurried in a Waring Blendor for five minutes to prepare a thick slurry. The slurry contains 30% organoclay and has a water/IPA ratio of 85/15. The 600, 300, and 3 rpm Fann readings, upon evaluations in Example 3 (Table 4) were 40, 30 and 14, respectively.

Comparative Examples A, B, and D indicate that the process of the present invention produces more efficient organoclay gellants than prior art processes wherein the clay is dispersed in hot water before reaction with the quaternary amine or the organoclay is dried. Comparative Examples C and E indicate that extrusion of the organoclay is necessary to prepare efficient gellants.

I claim:

1. A gellant comprising from about 58% to about 80% of an organophilic clay, from about 3% to about 10% of an alcohol having from 1 to 5 carbon atoms, and from about 15% to about 40% water.

2. The gellant of claim 1 wherein said organophilic clay is the reaction product of a smectite clay and a quaternary compound selected from the group consisting of quaternary ammonium salts, quaternary phosphonium salts, and mixtures thereof.

3. The gellant of claim 2 wherein the amount of said quaternary compound is from about 80 to about 110 milliequivalents per 100 grams of 100% active clay.

4. The gellant of claim 3 wherein said smectite clay is montmorillonite.

5. The gellant of claim 3 wherein said smectite clay is bentonite.

6. The gellant of claims 1, 2, 3, 4, or 5, which contains from about 61% to about 75% of said organoclay, from about 4% to about 9% of said alcohol, and from about 17% to about 35% water.

7. The gellant of claims 1, 2, 3, 4, or 5, wherein said alcohol is isopropanol.

8. The gellant of claims 1, 2, 3, 4, or 5, which contains from about 61% to about 75% of said organoclay, from about 4% to about 9% of isopropanol, and from about 17% to about 35% water.

9. An organoclay gellant slurry containing from about 20% to about 40% of an organophilic clay, from about 24% to about 78% water, and from about 2% to about 48% of an alcohol having from 1 to 5 carbon atoms, wherein the water to alcohol ratio is in the range from about 97.5/2.5 to about 35/65.

10. The slurry of claim 9 wherein said organophilic clay is the reaction product of a smectite clay and a quaternary compound selected from the group consisting of quaternary ammonium salts, quaternary phosphonium salts, and mixtures thereof.

11. The slurry of claim 10 wherein the amount of said quaternary compound is from about 80 to about 110 milliequivalents per 100 grams of 100% active clay.

12. The slurry of claim 11 wherein said smectite clay is montmorillonite.

13. The slurry of claim 11 wherein said smectite clay is bentonite.

14. The slurry of claims 9, 10, 11, 12, or 13, which contains from about 25% to about 45% of said organophilic clay and a viscosity reducing amount of a deflocculant for said organophilic clay.

15. The slurry of claims 9, 10, 11, 12, or 13, wherein said alcohol is isopropanol.

16. The slurry of claims 9, 10, 11, 12, or 13, which contains from about 25% to about 45% of said organophilic clay and a viscosity reducing amount of a deflocculant for said organophilic clay, wherein said alcohol is isopropanol.

17. The method of producing an organoclay gellant which comprises extruding a mixture containing a smectite clay, from about 75 to about 120 milliequivalents per 100 grams of 100% active clay of a quaternary compound selected from the group consisting of quaternary ammonium salts, quaternary phosphonium salts, and mixtures thereof, from about 25% to about 100%, based on the weight of 100% active clay, of water, and from about 5% to about 30%, based on the weight of 100% active clay, of an alcohol containing from 1 to 5 carbon atoms, and thereafter grinding the organoclay gellant without removing the water or alcohol therefrom.

18. The method of claim 17 wherein said smectite clay is montmorillonite.

19. The method of claim 17 wherein said smectite is bentonite.

20. The method of claim 17 wherein the amount of said quaternary compound is from about 80 to about 110 milliequivalents per 100 grams of 100% active clay, the amount of water is from about 35% to about 75%, based on the weight of 100% active clay, and the amount of alcohol is from about 10% to about 25%, based on the weight of 100% active clay.

21. The method of claim 20 wherein said smectite clay is montmorillonite.

22. The method of claim 20 wherein said smectite clay is bentonite.

23. The method of claims 17, 18, 19, 20, 21, or 22, wherein said alcohol is isopropanol.

24. The method of producing an organoclay gellant slurry which comprises extruding a mixture containing a smectite clay, from about 75 to about 120 milliequivalents per 100 grams of 100% active clay of a quaternary compound selected from the group consisting of quaternary ammonium salts, quaternary phosphonium salts, and mixtures thereof, from about 20% to about 100%, based on the weight of 100% active clay, of water, and from about 5% to about 50%, based on the weight of 100% active clay, of an alcohol containing from 1 to 5 carbon atoms, and thereafter shearing the extruded organoclay gellant in sufficient water and alcohol to produce said slurry, said slurry containing from about 20% to about 40% organoclay, from about 24% to about 78% water, and from about 2% to about 48% of said alcohol, wherein the water to alcohol ratio is in the range from about 97.5/2.5 to about 35/65.

25. The method of claim 24 wherein said smectite clay is montmorillonite.

26. The method of claim 24 wherein said smectite clay is bentonite.

27. The method of claim 24 wherein the amount of said quaternary ammonium compound is from about 80 to about 110 milliequivalents per 100 grams of 100% active clay.

28. The method of claim 27 wherein said smectite clay is montmorillonite.

29. The method of claim 27 wherein said smectite clay is bentonite.

30. The method of claim 24 wherein said slurry contains from about 35% to about 75% water, and from about 5% to about 30% of said alcohol, wherein the water to alcohol ratio is in the range from about 87.5/12.5 to about 65/35.

31. The method of claim 30 wherein said smectite clay is montmorillonite.

32. The method of claim 30 wherein said smectite clay is bentonite.

33. The method of claims 24, 25, 26, 27, 28, 29, 30, 31, or 32, wherein said alcohol is isopropanol.

34. The method of claims 24, 25, 26, 27, 28, 29, 30, 31, or 32, wherein said slurry contains from about 25% to about 45% of said organoclay and a viscosity reducing amount of a deflocculant for said organoclay.

35. The method of claims 24, 25, 26, 27, 28, 29, 30, 31, or 32, wherein said slurry contains from about 25% to about 45% of said organoclay and a viscosity reducing amount of a deflocculant for said organoclay, wherein said alcohol is isopropanol.

36. A method of increasing the viscosity of an oleaginous liquid which comprises extruding a mixture containing a smectite clay, from about 80 to about 110 milliequivalents per 100 grams of 100% active clay of a quaternary compound selected from the group consisting of quaternary ammonium salts, quaternary phosphonium salts, and mixtures thereof, from about 35% to about 100%, based on the weight of 100% active clay, of water, and from about 5% to about 30%, based on the weight of 100% active clay, of an alcohol containing from 1 to 5 carbon atoms, and thereafter dispersing the extrudate into the oleaginous liquid without removing the water of alcohol therefrom.

37. A method of increasing the viscosity of an oleaginous liquid which comprises extruding a mixture containing a smectite clay, from about 80 to about 110 milliequivalents per 100 grams of 100% active clay of a quaternary compound selected from the group consisting of quaternary ammonium salts, quaternary phosphonium salts, and mixtures thereof, from about 20% to about 100%, based on the weight of 100% active clay, of water, and from about 5% to about 50%, based on the weight of 100% active clay, of an alcohol containing from 1 to 5 carbon atoms, shearing the extrudate in sufficient water and said alcohol to produce a slurry, said slurry containing from about 20% to about 40% organoclay, from about 24% to about 78% water, and from about 2% to about 48% of said alcohol, wherein the water to alcohol ratio is in the range from about 97.5/2.5, to about 35/65, and thereafter mixing said slurry with said oleaginous liquid.

38. A method of increasing the viscosity of an oleaginous liquid which comprises mixing with the oleaginous liquid the gellant of claim 1, 2, 3, 4, 5, 9, 10, 11, 12, or 13.